(12) United States Patent
Dees et al.

(10) Patent No.: US 8,334,325 B2
(45) Date of Patent: *Dec. 18, 2012

(54) RUBBER DE-VULCANISATION

(75) Inventors: Michiel Jan Dees, Bunde (NL); Philip James Hough, Ross on Wire (GB)

(73) Assignee: Rubber-Regen LLP, Taunton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/673,679

(22) PCT Filed: Aug. 12, 2008

(86) PCT No.: PCT/EP2008/006623
§ 371 (c)(1),
(2), (4) Date: Oct. 1, 2010

(87) PCT Pub. No.: WO2009/021712
PCT Pub. Date: Feb. 19, 2009

(65) Prior Publication Data
US 2011/0009509 A1    Jan. 13, 2011

(30) Foreign Application Priority Data
Aug. 14, 2007   (EP) .................................... 07015939

(51) Int. Cl.
*C08J 11/04*   (2006.01)
(52) U.S. Cl. .............. 521/41; 521/40; 521/40.5; 521/43; 521/45.5; 528/480; 528/501; 528/502 R; 528/502 C
(58) Field of Classification Search .................... 521/40, 521/40.5, 41, 41.5, 42, 42.5, 43, 44, 44.5, 521/45.5; 528/480, 481, 483, 487, 490, 501, 528/502 R, 502 C, 502 E, 502 F, 503; 241/2, 241/5, 15
See application file for complete search history.

(56) References Cited

U.S. PATENT DOCUMENTS

| | | | |
|---|---|---|---|
| 6,279,633 B1 * | 8/2001 | Corvasce | 152/525 |
| 6,426,136 B1 | 7/2002 | Rouse et al. | |
| 6,548,560 B1 * | 4/2003 | Kovalak et al. | 521/41 |
| 6,680,110 B1 | 1/2004 | Deeb et al. | |
| 2003/0125401 A1 | 7/2003 | Tzoganakis | |

FOREIGN PATENT DOCUMENTS
WO   WO 2007/093782    8/2007

OTHER PUBLICATIONS

International Search Report for PCT/EP2008/006623, mailed May 26, 2009.
Written Opinion of the International Searching Authority for PCT/EP2008/006623, mailed May 26, 2009.

* cited by examiner

*Primary Examiner* — Frances Tischler
(74) *Attorney, Agent, or Firm* — Nixon & Vanderhye P.C.

(57) ABSTRACT

The present invention relates to a method for preferentially breaking cross-links in a vulcanised rubber, thereby de-vulcanising the rubber, by the use of a supercritical fluid, such as carbon dioxide. The supercritical fluid maintained at an appropriate solubility parameter, swells the vulcanised rubber to a state of equilibrium swell. The cross links (3) become fully extended and under strain to hold the internal pressures caused by the solvent swelling affect of the supercritical gas. When equilibrium swell has been achieved, the pressure within the processing vessel is rapidly dropped to a level of not less than 60% of the level at which saturation took place, causing a degassing and expansion of the supercritical fluid that has been absorbed within the vulcanised rubber. The resulting three dimensional separation of the rubber molecules will put a further rapid strain on the cross links, causing them to break (7), thereby giving the affect of de-vulcanization.

8 Claims, 2 Drawing Sheets

RUBBER DE-VULCANISATION

This application is the U.S. national phase of International Application No. PCT/EP2008/006623 filed 12 Aug. 2008, which designated the U.S. and claims priority to Europe Application No. 07015939.7 filed 14 Aug. 2007, the entire contents of each of which are hereby incorporated by reference.

Subject matter disclosed and claimed herein was made pursuant to a joint research agreement between RUBBER-REGEN LLP and DSM ELASTOMERS B.V., an affiliate of DSM IP Assets, B.V.

The present invention relates to a method for de-vulcanizing a vulcanised rubber.

Many millions of tonnes of vulcanised rubber waste are generated world wide each year from both end of life products such as automotive parts and from production line waste generated by rubber processors. For many years attempts have been made to find ways of recycling such waste into new rubber products for commercial, economic and legislative reasons, but although some methods show technical promise, none have been widely adopted by the rubber industry. The excellent physical and chemical properties of vulcanised rubbers that are exploited in a wide range of products make the recycling of these materials extremely difficult. Chemical cross-linking of adjacent rubber molecules results in thermoset properties and excellent thermal resistance. Vulcanised rubbers cannot therefore be melted and reformed as would be the case with thermoplastic polymers. In the same way, the stable three dimensional network of chemically cross-linked rubber molecules causes vulcanised rubbers to be insoluble in solvents, permitting only swelling to take place. A further characteristic of vulcanised rubber is that the vulcanisation process utilises the majority of chemically active sites along the rubber molecules, causing the surface of vulcanised rubber to have low surface energy leading to poor interfacial adhesion to a new rubber matrix.

Extensive research papers and patents describe a range of ways to overcome the inherent difficulties of recycling waste rubbers including methods for chemically increasing surface energy, and techniques for de-vulcanisation by chemical, biological or mechanical means, the use of heat or high frequency energy, or a combination of these methods. In many cases, the techniques described are slow. Alternatively they may employ toxic chemicals or use high levels of energy, and tend to be incapable of only cleaving cross-links without reducing the molecular weight of the rubber, resulting in a significant reduction of physical properties.

An object of this invention is to provide a method for de-vulcanising cured rubber while largely preserving the molecular weight of the rubber and therefore its potential physical and chemical properties when re-vulcanised or blended into a new rubber matrix. Further objects of this invention are to provide a rapid method of de-vulcanising cured rubber that is non hazardous to process operators or the environment and uses low levels of processing energy.

According to an aspect of the invention there is provided a method for de-vulcanizing a vulcanised rubber comprising: swelling said material in a supercritical fluid maintained at a supercritical pressure and temperature, whereby said supercritical fluid causes swelling of the said vulcanised rubber material, and a subsequent rapid reduction of the supercritical fluid pressure characterized in that the reduction of the pressure is less than 40% of the level that is applied during swelling and the rubber is a saturated rubber.

Accordingly, this invention provides a rapid non-hazardous process for destroying chemical cross-links in the cured saturated rubber while largely maintaining the molecular weight of the rubber molecules.

Without being bound by any theory, it is believed that the present invention is based on a rapid, but controlled three dimensional expansion of the swollen vulcanised saturated rubber, thereby causing preferential breakage of sulphur based cross-links.

A saturated rubber in this description is understood to be a rubber with a saturated backbone. Examples of saturated rubbers are ethylene α-olefin copolymers comprising one or more non-conjugated polyenes. Examples of α-olefins are for instance α-olefins with 3-10 carbon atoms, like propylene, butylene, hexene, octene etc. Preferably, propylene is used (EPDM).

Examples of non-conjugated polyene are 5-ethyliden-2-norbornene, 5-vinyl-2-norbornene, dicyclopentadiene, 1,4 hexadiene or mixtures thereof.

Preferably the vulcanised rubber is processed in a pressurised vessel containing carbon dioxide as a supercritical fluid at an appropriate temperature and pressure to achieve a solubility parameter suitable to swell the vulcanised rubber to an equilibrium state, as determined by the cross-link density and the distribution of cross-link types, i.e. cyclic sulphides, monosulphidic, disulphidic or polysulphidic, but may instead use other supercritical fluids such as nitrogen or a refrigerant. Once equilibrium swell conditions have been achieved, the supercritical fluid undergoes a rapid but controlled decompression, causing gassing of the supercritical fluid and expansion of the vulcanised rubber beyond the level of equilibrium swell determined by the constraining forces of the cross-links, thereby causing the cross-links to break. It is reported, by Tobolsky et al. in Polymer Science and Materials; Wiley-Interscience: New York, 1960 that in cross-linked diene rubber systems, sulphur-sulphur bonds are the weakest chemical bonds. The carbon-carbon single bond energy in peroxide-cross-linked vulcanised rubber is 93 kcal/mol, the bond energy of a carbon-sulphur-carbon bond in monosulphide cross-linked rubber is 50-60 kcal/mol, whereas the bond energy of a carbon-sulphur-sulphur-carbon bond in disulphide cross-linked rubber is 35 kcal/mol and the bond energy of a carbon-(sulphur)n-carbon bond in polysulphide cross-linked rubber is 27 kcal/mol. The invention exploits the weaker carbon-sulphur and sulphur-sulphur bonds by applying a three dimensional strain that exceeds the breaking strain of the cross-links while not exceeding the breaking strain of the carbon-carbon bonds along the back bone of the rubber molecule. It is further recognised that rubber molecules are highly extendable; being of considerable length with molecular weights typically greater than 100,000. By comparison, sulphur cross-links are very short in length and have very little ability to extend under conditions of strain.

The selection of temperature and pressure of the supercritical fluid during swelling are chosen such, that the solubility parameters δ of the rubber and the supercritical fluid are matched.

The solubility parameter of a fluid is normally measured in terms of the Hildebrand solubility parameter, which is defined as follows:

$$\delta = [(\Delta H - RT)/V_m]^{1/2}$$

where δ is the Hildebrand solubility parameter $(MPa)^{1/2}$
ΔH is the heat of vaporisation $(KJ\ mol^{-1})$
R is the universal gas constant $(KJ\ mol^{-1}\ K^{-1})$
T is temperature (Kelvin)
$V_m$ is the molar volume $(dm^3\ mol^{-1})$.

In general, substances having a similar value of solubility parameter mix well. In the case of a fluid and a polymer having a similar solubility parameter, the polymer will generally dissolve well in the fluid. However, in the case of a fluid and a polymer where the polymer exhibits a substantial degree of cross-linking (such as vulcanised rubber), the polymer does not dissolve in the fluid. Instead, the fluid permeates the polymer causing swelling.

Thus, in the case of a supercritical fluid (e.g. $CO_2$) diffusing into a vulcanised rubber, the selection of the process conditions controls the degree to which the supercritical fluid permeates the rubber. From the above equation, it can be seen that the solubility parameter of the supercritical $CO_2$ may be adjusted by modifying the pressure or the temperature of the fluid. Increasing the temperature will decrease the solubility parameter of the supercritical $CO_2$. By contrast, increasing the pressure will increase the solubility parameter. Therefore, by adjusting the temperature and pressure according to above equation, the solubility parameter of the supercritical fluid and that of the vulcanised rubber can be matched to maximise the swelling of the vulcanised rubber. It is desirable to maximise the swelling of the rubber because this means that the sulphur-containing cross links are extended before the external pressure is reduced, so that when this pressure drop takes place, the maximum internal pressure is applied to the sulphur containing cross links causing the cross links to exceed their point of maximum extension, resulting in their rupture.

Starting from conditions under which the supercritical fluid exhibits a lower solubility parameter than the vulcanised rubber, the level of equilibrium swelling of the rubber will increase as the solubility parameter of the supercritical fluid increases towards the solubility parameter value of the rubber material. As the solubility parameter of the supercritical fluid approaches that of the vulcanised rubber, the degree of swelling of the vulcanised rubber will level off before beginning to decrease as the solubility parameter of the supercritical fluid increases beyond that of the vulcanised rubber.

Typical solubility parameters of rubbers are in the range 14-22 $MPa^{1/2}$ with polar vulcanised rubbers tending to have a value of solubility parameter at the higher end of this scale. For supercritical $CO_2$ at a temperature of about 305K (just above the critical point) this corresponds to a pressure range between about 10 and 40 MPa. However, in practice, the degree of swelling is observed to increase relatively rapidly with pressure up to about 10 MPa and then more slowly up to the value at which maximum swell is achieved.

The application of high pressures does increase the cost of the process and so in some embodiments, it is preferred that the initial pressure be less than the pressure required to obtain the maximum level of equilibrium swell, for example the pressure level may be set at or slightly above the level at which the variation of swelling with increased pressure begins to level off. The initial pressure level selected will therefore depend on the vulcanised rubber but will usually be less than 40 MPa, such as less than 30 MPa, for example less than 20 MPa or less than 15 MPa e.g. less than 12 MPa. The initial pressure level must be above the supercritical level of the fluid and so is preferably greater than 8 MPa, for example greater than 9 MPa, such as greater than 10 MPa.

As well as the pressure, it is necessary to control the temperature of the supercritical fluid. Since the solubility parameter decreases with increasing temperature, it is generally preferred that the initial temperature be maintained at as low a level as will allow the fluid to remain supercritical, in order to reduce the pressure required to achieve a given solubility parameter. However, in some embodiments, particularly those in which it is desired that the fluid remain supercritical following the initial pressure reduction step, the initial temperature may be higher.

In the case of $CO_2$, the critical temperature is 31.1° C. and so, depending on the embodiment, the initial temperature of the $CO_2$ is preferably maintained at a temperature greater than 32° C., for example greater than 40° C., such as greater than 50° C., or greater than 60° C. The initial temperature of the $CO_2$ will also usually be less than 140° C., for example less than 120° C., such as less than 100° C., or less than 80° C.

As mentioned above, at a given temperature, the degree of swelling of the vulcanised rubber increases relatively quickly with pressure up to a given pressure value and then more slowly as pressure increases beyond this value. This has the advantageous effect that at relatively high pressures, the degree of swell obtainable following an initial pressure drop is only slightly less than that obtainable at the initial pressure.

This enables the use of a multistage pressure reduction in which the pressure is reduced as previously specified and then the rubber allowed to reach equilibrium swell before the pressure is reduced again. The equilibration process following the initial pressure reduction takes place much more quickly where the fluid remains in a supercritical state than when the fluid becomes subcritical on the pressure reduction. This allows for an increased yield of de-vulcanised rubber in a shorter timescale than would be the case if the fluid needed to be repressurised in order to become supercritical and repermeate the rubber.

A more detailed description of the invention will now be given with reference to the accompanying drawings in which.

Central to the invention is that supercritical fluids display unique physiochemical properties: they are of low viscosity, high diffusivity and have high thermal conductivity. Under the correct conditions of temperature and pressure the solubility parameter of supercritical fluids can be controlled to closely match the solubility parameter of vulcanised rubber, making the supercritical fluid an excellent solvent for vulcanised rubber, allowing easy impregnation into the rubbers three dimensional molecular network, causing it to swell. Among several supercritical fluids, $CO_2$ is the most advantageous for this invention, having an easily obtainable critical point and being chemically inactive, non-toxic, non-flammable and inexpensive.

Figure 1:
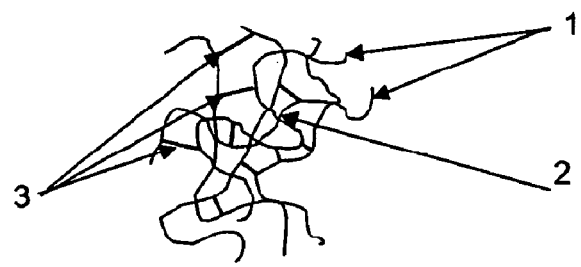
FIG. 1 Shows a representation of relaxed cross-linked rubber molecules in normal ambient conditions.

FIG. 1 shows a representation of vulcanised rubber in a relaxed state consisting of long chained molecules (1) held together by some chain entanglement (2), but predominantly by the presence of chemical cross-links (3) between adjacent molecules. It is the combination of highly extendable long chained molecules and chemical cross-links that gives rubber its unique elastic properties. Without the influence of chemical cross-links, rubbers would be predominantly plastic by nature and would be easily dissolved by suitable solvents to form free flowing solutions. Within the present invention, the rubber would preferably be sourced from vulcanised process waste generated from rubber processing industry or from end of life vulcanised rubber products. Also within the present invention the vulcanised rubber would be as a formed solid, but would preferably undergo a process of grinding prior to the process described herein as the invention to form a particulate of the vulcanised rubber. The particulate size and shape is not critical to the outcome of the invention process, although its efficiency will be affected. Smaller particles offer an improved surface area to volume ratio for the effectiveness and efficiency of the invention. Typically, the particle size of the vulcanised rubber particulate might be from 10 mm diameter reducing to 0.038 mm (ASTM mesh No. 400), but would preferably be within the range of 1.00 mm (18 mesh) to 0.15 mm (100 mesh), and more preferably be within the range of 0.425 mm (40 mesh) to 0.18 mm (80 mesh) which offers a balance of useful surface area to volume ration and reasonable grinding cost.

Figure 2:
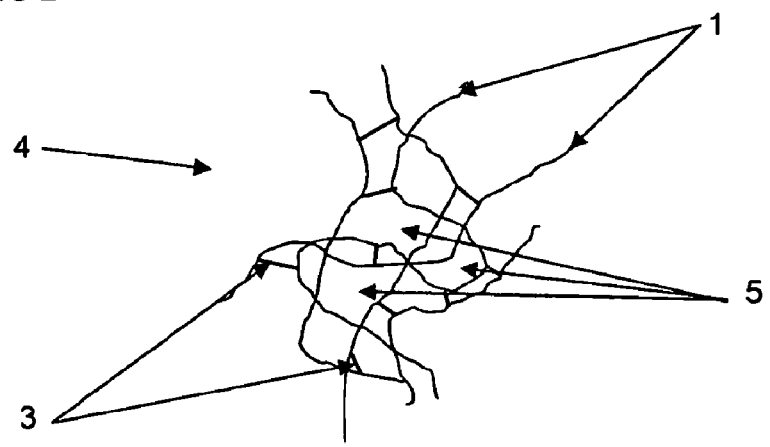
FIG. 2 Shows a representation of cross-linked rubber molecules in a swollen state in supercritical fluid at an appropriate temperature and pressure to maintain a supercritical state.

The vulcanised rubber, preferably in particulate form, as described, is placed into a temperature controllable pressure vessel such as an autoclave. Carbon dioxide in gas or liquid form, but preferably in liquid form is pumped into the pressure vessel at or above its critical pressure of 7.4 Mpa. The temperature of the interior of the pressure vessel is then increased to, or above the supercritical temperature of carbon dioxide, being equal to or greater than 31.1° C. so that the carbon dioxide becomes a supercritical fluid and fills the autoclave chamber. At supercritical conditions the density of carbon dioxide as a supercritical fluid is 0.469 g/cm$^3$. The density of the supercritical fluid, its diffusivity into polymeric materials and its solubility parameter is, however, highly dependent upon changes to both temperature and pressure above the critical points. This has been described by M. Kojima, M. Tosaka, E. Funami, K. Nitta, M. Ohshima, S. Kohjiya, in "Phase Behaviour of Crosslinked Polyisoprene Rubber and Supercritical Carbon Dioxide" allowing someone trained in the art to select an optimum set of conditions so as to match the solubility parameter of the vulcanised rubber to be processed, thereby enabling conditions for rapid advancement to equilibrium swell. FIG. 2 portrays the vulcanised rubber under conditions of equilibrium swell in a supercritical fluid (4). The rubber molecules (1) are separated by the diffusion of the supercritical fluid (5), but inhibited from further separation by the three dimensional network of chemical cross-links (3). As the restraining influence on the rubber molecules, the cross-links will be under their maximum strain when the rubber is at equilibrium swell.

A further embodiment of this invention permits the equilibrium swell of the outer surface of the vulcanised rubber particulate only. As the supercritical fluid will migrate through the outer surface towards the centre of each vulcanised rubber particle, the outer surface of each vulcanised rubber particle will reach a state of equilibrium swell before such a state is achieved at the centre of the rubber particle. Subsequent processing described herein within the scope of the invention will thereby achieve de-vulcanisation of the outer crust of each rubber particle, allowing the retention of the rubber's original physical properties within the core of each rubber particle. Later inclusion of the treated particulate rubber as an additive to a new rubber mix will permit chemical cross-linking between the de-vulcanised outer surface of the rubber and the new rubber matrix.

The surface depth of de-vulcanisation will vary depending on the particle geometry but will typically involve significant de-vulcanisation (i.e. breakage of greater than 10%, for example greater than 30% or greater than 50% of sulphur containing bonds in a region) to a depth of less than 20% of the largest particle diameter, for example less than 10%, such as less than 5%.

A further embodiment of this invention exploits the excellent solvent and dissipation properties of supercritical fluids to act as a carrier for active additives such as chemical de-vulcanising agents. A de-vulcanising agent is preferably selected from phenyl-hydrazine-iron chloride, triphenyl phosphine, thiols and disulphides. The use of such additives assists with the processes of de-vulcanisation through chemical cleavage of a proportion of sulphur cross-links prior to physical cleavage through the preferred embodiment of this invention A further advantage of this invention again is based on the excellent solvent and dissipation properties of supercritical fluids. Supercritical fluids will therefore extract low molecular weight materials commonly found within typical vulcanised rubber compounds, examples of which being monomers, oils, waxes and soaps which, individually or in combination migrate to the surface of vulcanised rubber and act to form a surface contaminant that reduces or destroys both physical and chemical bonds at the rubber/adhesive interface. Such extraction of low molecular weight contaminants found within vulcanised rubber will in itself serve to improve the compatibility of vulcanised rubber into a new rubber mix matrix, by improving interface wettability, leading to a greater intimacy of surface contact.

Figure 3:
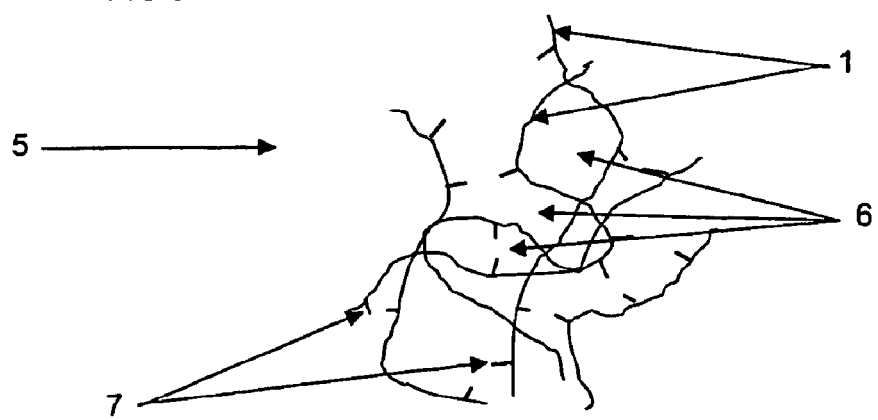
FIG. 3 Shows a representation of de-vulcanised rubber molecules and broken cross-links after a rapid decompression of the supercritical fluid causes a three dimensional separation of the molecules beyond the extendable limit of the cross-links, thereby causing the cross-links to fracture.

Once equilibrium swell is achieved, the internal pressure of the pressure vessel is rapidly dropped whereby the reduction of the pressure is less than 40% of the level that is applied during swelling as demonstrated by FIG. 3. The supercritical fluid around the vulcanised rubber will revert to a gaseous state (5), causing a sudden pressure difference between the autoclave chamber pressure and the internal pressure within the vulcanised rubber, due to supercritical fluid remaining partially trapped between the rubber molecules. In an attempt to achieve a pressure equilibrium, the supercritical fluid between the rubber molecules will rapidly expand (6), forcing separation of the rubber molecules (1) beyond the restraining capability of the cross-links, causing the cross-links to fracture (7). FIG. 3 further comprises two pressure drops outside the scope of the present invention with pressure drops of respectively 55% and 100%. This figure demonstrates that the amount of extractable material decreases at a pressure drop of more than 40%.

Deeb, Victor M and Rouse, Michael W in U.S. Pat. No. 6,680,110 describe a method for size reduction of particulate materials, including rubbers, by allowing a rapid 100% pressure drop to atmospheric pressure after swelling said materials in a supercritical fluid. FIG. 3 shows that under these conditions the amount of extractable materials is hardly more than the amount of extractable materials present in the original material.

A reduction of the pressure which is more than 40% of the level that is applied during swelling, causes an explosive decompression with breakage of the long chained rubber molecules, thus tearing the rubber apart, as used to good effect by Deeb et. Al.

A reduction of the pressure which is less than 40% of the level that is applied during swelling, causes the preferential breakage of the chemical cross-links.

In controlling the rapid decompression of the vulcanised rubber in order to maximise the breaking of the sulphur-containing linkages whilst avoiding macroscopic structural damage to the rubber (i.e. as would result from explosive decompression), the absolute initial and final pressure values are less important than the absolute pressure difference of the decompression step.

The structure of the vulcanised rubber may be considered to be a system of entangled rubber molecules, in which the molecules are cross-linked by sulphur-containing groups, effectively forming free volume into which the supercritical fluid may penetrate.

Following a reduction in external pressure, the internal pressure of a vulcanised rubber particle can be released in a number of ways:
(i) diffusion of the fluid from the rubber particle;
(ii) reorganisation of the rubber polymer chains to allow the fluid to leave the free volume more quickly;
(iii) breaking of the sulphur-containing bonds to allow the free volume to expand thereby reducing the internal pressure of the particle;
(iv) macroscopic damage to the rubber structure forming pores that allow the pressure to escape.

As seen previously, the bond energies of the sulphur containing cross links are smaller than those of the polymeric carbon-carbon bonds (27-60 Kcal mol$^{-1}$ vs 93 Kcal mol$^{-1}$). Therefore, the degree to which the different bonds are broken depends in part on the initial pressure difference between the inside of the vulcanised rubber particle and the external system.

During the initial loading of the vulcanised rubber with the supercritical fluid, equilibrium swell is attained when the expansion of the free volume within the rubber is equally constrained by the sulphur-containing cross links.

Following the depressurisation step, if the pressure difference is sufficiently low, the strength of the cross links will be sufficient to retain the internal connectivity of the rubber and the fluid will diffuse out of the particle, with perhaps some rearrangement of the polymer particles to allow more rapid equilibration.

Following the initial reduction of external pressure, the largest effect of the pressure difference will be experienced by the free volume closest to the surface of the rubber particle. Provided the pressure drop is sufficiently large to break some of the sulfur-containing bonds that constrain this region of the free volume, the free volume will then be free to expand to an extent determined by the elasticity of the rubber, in order to reduce the pressure difference between the interior of the free volume and the external system.

As the region of free volume closest to the surface expands, the underlying layer of free volume will experience an increase in pressure difference to a level slightly below that initially experienced by the free volume closest to the surface. If this pressure difference is still large enough to break some of the sulfur-containing bonds constraining the expansion of this region of free volume, then it will also expand to reduce the pressure difference between it and the free volume closest to the rubber surface.

This process continues with successive layers of free volume expanding due to breaking of cross-linkages until the pressure difference between the adjacent layers is no longer sufficient to break even the weakest polysulphide bonds. At this stage, the internal and external pressures will equilibrate due to diffusion of the fluid from the particle to the external system.

From the above, it may seem that a minimum pressure drop of at least 5% is required to break the weakest bonds constraining the expansion of the free volume in the outer layer (polysulphide bonds). If the pressure drop is less than this minimum value, the fluid will simply diffuse out of the rubber particle without changing its structure.

If the pressure drop is just above the minimum value to break the polysulphidic bonds, some of the weakest polysulphide bonds in the outer region of free volume will break allowing expansion of the outer region to a level such that the pressure in this outer region of free volume reduces to a level below that required to break any remaining polysulphide bonds. The next layer of free volume may then also experience a corresponding pressure difference sufficient to break some of the weaker polysulphide bonds. Because the outer layer remains at a slightly higher pressure than the external system, the pressure difference between the next innermost layer and the outer layer is less than the initial pressure difference between the free volume of the outer layer and the external system. This means that the pressure difference experienced by successive layers of free volume decreases on moving inward from the surface layer and so this pressure difference will eventually be insufficient to break even the weakest polysulphide bonds. In addition, the expansion of free volume in the inner layers is hindered by the presence of the layer immediately above since the expansion of the other layer will pressurise the layer above, thereby moderating the expansion of the inner layer.

In order to increase the proportion of sulfur-containing cross links broken, the pressure drop may be increased. As the pressure drop increases, more of the sulphur-containing cross links in the outer layer will break, in addition, the depth of penetration into the particle will also increase. Both of these factors will initially increase the yield of the de-vulcanised rubber from the depressurisation step.

As the size of the pressure drop increases further, the resulting pressure difference will become sufficient to begin to break the stronger sulfur-containing cross links such as the C—S—S—C disulphide bond and then the C—S—C monosulphide bond. At this stage, the yield will still be increasing as the pressure drop increases. However, eventually the pressure drop will be sufficiently large that, in order to equilibrate the internal and external pressure, the de-vulcanised rubber will begin to suffer macroscopic damage. At this stage, the yield will begin to decrease due to the fluid creating microscopic pores in the particle from which it can escape, thereby relieving the pressure on the cross links. As mentioned above the pressure drop takes place on a timescale that is rapid compared to the rate of diffusion of the supercritical fluid from the particle in order to minimise internal pressure loss by diffusion.

The rate of pressure drop at its greatest rate would be virtually instantaneous and governed by the design of the process, but may advantageously be regulated and controlled as a function of time.

As mentioned above, following a depressurisation step, sulphur-containing bonds in the region of free volume closest to the surface of the rubber particle are broken allowing this region of free volume to expand until the pressure within the region reduces to a level that is no longer sufficient to break the weakest polysulphide bonds constraining further expansion of the free volume in this region. It is possible to increase the number of bonds broken by increasing the size of the pressure drop. However, this will eventually result in a decrease in yield due to macroscopic damage to the structure of the rubber taking place.

However, by controlling the rate at which the external pressure is reduced, it is possible to maintain a pressure difference between the external system and a free volume in the particle that is sufficiently high to allow further sulphur-containing bonds to be broken once the initial expansion of the outer region of free volume has taken place whilst minimising any damage to the structure of the rubber.

Since the severity of the decompression experienced by the particle is reduced by reducing the rate at which the pressure drops, a larger pressure difference may typically be used for embodiments in which reduction of pressure from its initial value to its final value takes place over a longer timescale.

The pressure drop is typically greater than 2 bar, for example greater than 0.5 MPa such as greater than 1 MPa or greater than 1.5 MPa. The pressure drop would also typically be less than 30 MPa, such as less than 20 MPA or less than 10 MPa. The pressure drop may also be less than 5 MPa, such as less than 3 MPa, for example less than 2.5 MPa.

In embodiments in which the pressure drop takes place over a short timescale, for example less than 5 seconds, the pressure drop is generally selected to be towards the lower end of this range. In general, this pressure drop is less than 10 MPa, such as less than 5 MPa, for example less than 3 MPa, or less than 2.5 MPa. The pressure drop is also generally greater than 0.2 MPa, for example greater than 0.5 MPa, such as greater than 1.0 MPa, or greater than 1.5 MPa.

In general the pressure drop would take place over a timescale of greater than 0.5 seconds, for example greater than 1 second, such as greater than 2 seconds. The pressure drop would also typically take place over a timescale of less than 60 seconds, for example less than 30 seconds, such as less than 15 seconds or less than 5 seconds.

In embodiments in which the pressure drop takes place over a timescale of less than 60 seconds, the pressure drop may take place over a timescale of greater than 5 seconds, for example greater than 15 seconds, such as greater than 30 seconds.

In embodiments in which the pressure drop takes place over a timescale of less than 30 seconds, the pressure drop may take place over a timescale of greater than 5 seconds, for example greater than 15 seconds.

In embodiments in which the pressure drop takes place over a timescale of less than 15 seconds, the pressure drop may take place over a timescale of greater than 5 seconds.

In embodiments in which the pressure drop takes place over a timescale of less than 5 seconds (for example less than 4 seconds or less than 2 seconds), the pressure drop may take place over a timescale of greater than 0.5 seconds, for example greater than 1 second.

In most embodiments, the time taken for the pressure to drop from its initial value to its final value would be less than $1/10^{th}$ of the time required for the pressure to equilibrate by diffusion, for example less than $1/50^{th}$, such as less than $1/100^{th}$ or less than $1/500^{th}$.

It is therefore possible to optimise the yields by selecting the size and rate of the pressure drop. However, at the highest yield, it is likely that some damage is being done to the structure of the rubber.

In a further embodiment of the invention, the yield of de-vulcanised rubber may be improved by employing a multistage process in which more than one pressure drop at the preferred rate is employed. This multistage process comprises applying a controlled pressure drop and rate as in the single stage process and then applying a further controlled pressure drop and rate. This process may be repeated as required.

In this way, further sulphur-containing cross linkages may be broken whilst minimising damage to the structure of the rubber, thereby increasing the yield of de-vulcanised rubber.

It is preferred that following each pressure drop, equilibrium swell is attained before the next pressure drop is applied. This reduces the pressure drop required to break the sulphur-containing bonds because it minimises the expansion of the free volume required to put strain on the cross linkages. For this reason, it is further preferred that the overall pressure range is selected so that the supercritical fluid solubility parameter remains as close as possible to that as the vulcanised rubber. This allows the swelling of the rubber to be maximised during each stage. If the solubility parameter of the rubber is too high to be conveniently achieved without the use of excessively high pressure, the initial pressure of the multistage process may be selected so that following the initial pressure drop, the solubility parameter of the supercritical fluid remains within 2 $MPa^{1/2}$ of the initial solubility parameter, preferably within 1 $MPa^{1/2}$ more preferably within 0.5 $MPa^{1/2}$.

It is also preferred that the fluid remains supercritical during the multistage process to allow more rapid equilibrations between stages.

The larger the number of pressure drop steps the larger the yield of de-vulcanised rubber. However the successive additional yield decreases with each step. In addition the process time increases as the number of depressurisation steps increases. The typical number of pressure drops in the multistage process will therefore usually be fewer than 10, for example fewer than 5 such as 2-4.

The size and rate of each pressure drop is selected to minimise damage to the rubber, whilst being large enough to cause breakage of sulphur-containing cross linkages.

In embodiments where the pressure drop takes place relatively quickly (for example over a timescale of less than 5 seconds) the pressure drop will typically be greater than 0.2 MPa, for example greater than 0.5 MPa, such as greater than 1.0 MPa. The pressure drop will also usually be less then 3.0 MPa, for example less than 2.5 MPa, such as less then 2.0 MPa or less than 1.5 MPa.

In embodiments where the pressure drop takes place relatively slowly, (for example over a timescale of 5 to 60 seconds) the pressure drop will typically be greater than 1.0 MPa, for example greater than 1.5 MPa, such as greater than 2.0 MPa or greater than 2.5 MPa. The pressure drop will also usually be less than 30 MPa, such as less than 20 MPa or less than 10 MPa. The pressure drop may also be less than 5 MPa.

In addition, as described previously, the initial temperature of the fluid should be selected so that, in embodiments where it is required that the fluid remains supercritical, any temperature reduction associated with the pressure drop should be small enough to enable the fluid to remain supercritical.

Following the de-vulcanisation process of the invention, the product may be employed in general rubber applications or alternatively, further processed, for example by solvent extraction, in order to separate the de-vulcanised material from the remaining vulcanised material in the rubber material.

Solvent extraction may be carried out using any solvent which selectively removes the de-vulcanised rubber from the rubber material. The solvent preferably exhibits a solubility parameter in the range 15 to 18 $MPa^{1/2}$ for non-polar rubbers and may for example be toluene, and a range of 18 to 24 $MPa^{1/2}$ for polar polymers and may for example be methyl ethyl ketone.

The de-vulcanised rubber of the invention comprises a number of advantageous properties.

For example, higher addition levels of the de-vulcanised rubber as an additive to a new rubber compound can be made, compared to non-de-vulcanised rubber, while retaining superior processing properties and vulcanised physical properties.

The process of the invention increases the level of solvent extractable material within the de-vulcanised rubber when compared with non-de-vulcanised rubber. The solvent extractable material, having visco-elasticity and tack contributes to easier incorporation of the de-vulcanised rubber into a new rubber mix, thereby permitting higher addition levels to a new rubber mix when compared with non-de-vulcanised rubber.

In addition, the de-vulcanised rubber exhibits increased chemical activity with respect to free radicals, when compared to vulcanised rubber, thereby permitting chemical cross linking within a new rubber matrix. This gives enhanced vulcanised physical properties to the compound when compared to the use of equivalent addition levels of vulcanised rubber.

The de-vulcanised rubber made with the method of the invention is a powder that can be stored in bags, or pressed into bales. In order to prevent the powder particles from sticking together the devulcanized rubber may be dusted with a partitioning agent.

An additional advantage of the present invention can be obtained, when a de-vulcanised saturated rubber is mixed in an unsaturated rubber like NR, SRB, BR, or a mixture of these.

The poor UV and ozone resistance is a well known problem of unsaturated rubbers. It has been described by e.g. Kannika Sahakaro, et. al in Journal of Applied Polymer Science, Vol. 103, 2555-2563 (2007). Kannika Sahakaro, et describe that EPDM incorporated into blends of natural rubber/butadiene rubber (NR/BR) improves ozone resistance. The inferior mechanical properties of NR/BR/EPDM blends generally obtained by conventional straight mixing are overcome by utilizing a reactive processing technique.

An alternative for this cumbersome reactive processing technique is given by the present invention by using the de-vulcanised saturated rubber as a component of a new rubber mix, further comprising a base polymer, an activator system, accelerator system and cross-linking agent and optionally structural and non-structural fillers, processing oils, process aids, and or a protective system.

Preferably the de-vulcanised saturated rubber in such a new rubber mix is EPDM, due to its excellent UV and ozone resistance. EPDM is particularly advantageous in a new rubber mix, wherein the base polymer is SBR, BR, NR or a mixture of these.

Figure 4:
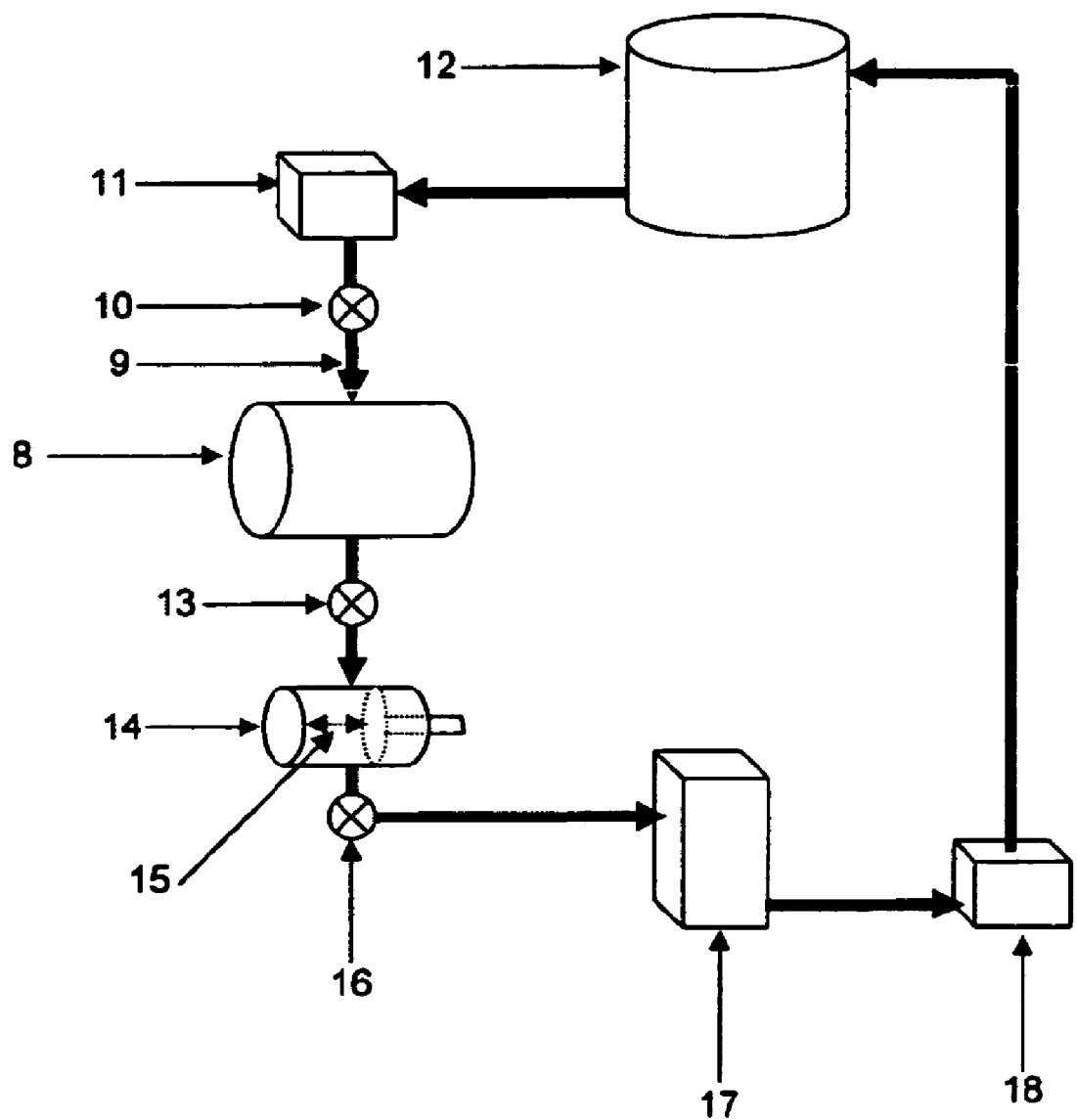
FIG. 4 Shows a representation of the processing equipment in which to carry out the functional operations of the invention.

FIG. 4 shows the basic components of the process necessary to carry out decompression de-vulcanisation as described within the process of the present invention. The pressure vessel (8) would preferably be capable of operating between temperatures of 20° C. to 175° C. while maintaining a temperature control of +/−1° C., and preferably capable of withstanding internal operating pressures from 0 MPa to 20 MPa. Vulcanised rubber, preferably in particulate form, and preferably being of a particulate size of 0.425 mm to 0.18 mm across its largest dimension is loaded into, and sealed within the pressure vessel. The volume of vulcanised rubber loaded into the pressure vessel must be small enough to allow the vulcanised rubber to reach equilibrium swell, and to allow further expansion due to subsequent rapid decompression. The level of swell achievable by a vulcanised rubber will vary considerably depending upon the components used within the rubber formulation. The type of base polymer, different fillers and loadings, and the type and density of cross-links will all affect the swell behaviour of vulcanised rubber in a solvent. Tests will therefore be necessary to establish the level of swell achievable by any given type, batch, grade or quality of vulcanised rubber. It is normal however that the initial volume of vulcanised rubber within one processing batch will be less than 20% of the internal volume of the pressure vessel.

The pressure vessel (8) would be served by an inlet pipe (9) and non-return valve (10) suited to the delivery of gasses and fluids, through which a gas or a liquid, being preferably a liquid and further, being preferably liquid carbon dioxide, is pumped from a storage vessel (11) by a suitable high pressure pump (12) into the pressure vessel up to or beyond the supercritical pressure of the gas or liquid which, for carbon dioxide is a pressure of 7.4 MPa. Once the supercritical pressure is achieved, heaters within the pressure vessel increase the temperature of the liquid gas up to or beyond the supercritical temperature which for carbon dioxide is 31.1° C., causing the liquid gas to change into a supercritical fluid. The supercritical fluid will completely fill the pressure vessel and will come into intimate contact with the vulcanised rubber. The pressure within the pressure vessel will then be increased as necessary by an operator skilled in the art, to achieve the optimum solubility performance for the vulcanized rubber being processed. Pressure and temperature is maintained to preserve optimum conditions for a period sufficient to achieve equilibrium swell.

Once the vulcanised rubber has reached a state of equilibrium swell, a quick release valve (13) is opened permitting the rapid escape of the pressurised supercritical fluid, and a consequent sudden drop in the internal pressure of the pressure vessel. Control of the pressure drop is achieved by not venting to atmosphere, but rather by venting to a receiver (14) of adjustable internal volume (15), having the effect of suddenly increasing the internal volume of the pressure vessel. It is an aspect of the present invention that the receiver has an adjustable internal volume, determined by the use of different sized receivers, or preferably by the use of an adjustable sealed internal plate. The volume of the receiver dictates the level of pressure drop within the pressure vessel, and therefore the extent of the three dimensional expansion of the processed rubber. The larger is the internal volume of the receiver, the greater will be the pressure drop and the extent of the three dimensional expansion experienced by the processed rubber.

A further aspect of the present invention is that once the rapid pressure drop has been achieved, a further slow pressure drop is controlled by opening a bleed outlet valve (16) on the receiver, allowing a controlled pressure drop of gas to atmosphere, or preferably through a cooler (17) to convert the gas back to a liquid for pumping back (18) to the storage vessel (11), permitting closed loop recycling of the processing gas. The rate of the slow pressure drop must be controlled to permit the release of supercritical fluid from within the processed rubber without causing physical damage to the processed rubber, and must preferably match the rate of diffusion of the supercritical fluid from the processed rubber as it converts to gas.

When the pressure within the pressure vessel is reduced to a pressure equal to atmospheric pressure, the pressure vessel may be opened, and the processed rubber, now in a predominantly de-vulcanised state may be removed.

De-vulcanised rubber resulting from the process described within the embodiments of this invention can be processed by someone skilled in the art of using conventional rubber mixing, forming and curing technologies, as commonly found within the rubber processing industry, including formulating, mixing, milling, calendering, extrusion, compression moulding, transfer moulding, injection moulding, fabrication and pressureless curing techniques. Reuse of the fully de-vulcanised rubber may be achieved by mixing the de-vulcanised rubber with a cure system consisting of activators, accelerators and a cross-linking agent such as sulphur, selected by someone skilled in the art to achieve desired processing and curing characteristics. Other ingredients such as fillers, processing oils, plasticizers, and miscellaneous protective systems may also be added as required to achieve desired physical and processing properties. A further use of the de-vulcanised rubber is as an additive into a new rubber mix, acting as a partial replacement for virgin compounding ingredients including polymer, reinforcing filler and non-reinforcing filler. Use of the de-vulcanised rubber may be achieved in this way by mixing the de-vulcanised rubber as a proportion of the whole mix with conventional ingredients such as polymer, reinforcing and non-reinforcing fillers, process oils, process aids, miscellaneous protective systems and a cure system consisting of activators, accelerators and a cross-linking agent such as sulphur, selected by someone skilled in the art to achieve desired processing and curing characteristics.

Preparation of the compound can be carried out in a conventional mixer, e.g. an internal mixer having tangential rotors or intermeshing mixing elements. Other kinds of internal mixer or other mixer may be used; it is a feature of the present technology that special equipment is generally not required. Equally, the sequence of addition of compound ingredients may be generally conventional.

Fill factor and addition times can be established in line with conventional skill to suit the machine in which the compound is mixed. Dump temperature should be controlled to maintain scorch safety, e.g. to below 110° C. The temperature in the mix during mixing (arising primarily from shear forces) is typically between 100° C. and 150° C. Mixing time is typically between 1 and 8 minutes.

Once mixed, the compound containing the dispersed rubber crumb forms a coherent processable batch which can be discharged from the mixer onto a suitable processing apparatus such as a two-roll open mill. In line with conventional practice, further dispersion of the components can be achieved by cutting and blending the mixed batch on the two roll mill.

From a two roll mill, the mixed batch can be passed as a continuous coherent sheet which is able to support its own weight. This may then be processed in a conventional way, e.g. being passed through an anti-tack dip and allowed to cool before removal from the process and subsequent forming e.g. by compression moulding. Typically this may involve processing into a sheet of predetermined thickness and width using a calender. This gives the necessary accurate dimensions for subsequent moulding in a compression press, either by continuous feed of the calendered sheet or by the use of moulding blanks cut from the calendered sheet. Typical moulding is carried out at a temperature between 130° C. and 180° C. using a closing force sufficient to fully form the desired moulded product.

The invention claimed is:

1. A method for de-vulcanizing a vulcanised saturated rubber comprising:
    swelling a vulcanised saturated rubber material in a supercritical fluid maintained at a supercritical fluid pressure and temperature to cause swelling of the rubber material, and
    subsequently rapidly reducing the supercritical fluid pressure, wherein
    the reduction of the supercritical fluid pressure is by less than 40% of the pressure that is applied during swelling of the rubber material, and wherein
    the rate and the rapid reduction of the supercritical fluid pressure is controlled to obtain preferential breaking of sulphur-containing linkages relative to carbon-carbon bonds in the vulcanised rubber material without explosive decompression thereof, thus avoiding macroscopic structural damage to the vulcanised rubber material.

2. A method according to claim 1, further comprising adding an additive to the supercritical fluid before allowing said vulcanised rubber to swell.

3. A method according to claim 1, wherein the reduction of the supercritical fluid pressure takes place before equilibrium swelling is obtained.

4. A method according to claim 1, wherein the saturated rubber is EPDM.

5. A method according to claim 1, wherein the de-vulcanised rubber is mixed with a cure system and re-vulcanised.

6. A method according to claim 1, wherein the pressure reduction in said rapid reduction of supercritical fluid pressure is by more than 5% of the pressure for swelling the rubber material.

7. A method according to claim 1, wherein the pressure reduction in said rapid reduction of supercritical fluid pressure is by less than 30% of the pressure for swelling the rubber material.

8. A method according to claim 1, wherein the pressure reduction in said rapid reduction of supercritical fluid pressure is by more than 10% of the pressure for swelling the rubber material.

* * * * *